United States Patent

Harrison et al.

[11] Patent Number: 5,960,090
[45] Date of Patent: Sep. 28, 1999

[54] PROCESS AND DEVICE FOR WIRELESS TRANSMISSION

[75] Inventors: David Harrison, la Bouexière; Christopher Howson; Ali Louzir, both of Rennes, all of France

[73] Assignee: Thomson multimedia S.A., Boulogne, France

[21] Appl. No.: 08/770,095

[22] Filed: Dec. 19, 1996

[30] Foreign Application Priority Data

Dec. 29, 1995 [FR] France .................................. 95 15742

[51] Int. Cl.$^6$ ...................................................... H04B 3/00
[52] U.S. Cl. .................................. 381/77; 381/2; 455/42; 455/102
[58] Field of Search .................................. 381/2, 15, 16, 381/300, 306, 307, 311, 77, 79; 455/42, 43, 44, 65, 93, 108, 109, 110, 102; 375/300, 268

[56] References Cited

U.S. PATENT DOCUMENTS

| | | | |
|---|---|---|---|
| 4,349,842 | 9/1982 | Apeldoorn et al. | |
| 4,660,192 | 4/1987 | Pomatto, Sr. | 455/102 |
| 5,079,525 | 1/1992 | Ishikawa et al. | 455/102 |
| 5,666,422 | 9/1997 | Harrison et al. | 381/18 |
| 5,668,884 | 9/1997 | Clair, Jr. et al. | 381/82 |

FOREIGN PATENT DOCUMENTS

| | | |
|---|---|---|
| 0432 052 A2 | 6/1991 | European Pat. Off. |
| 0471 477 A1 | 2/1992 | European Pat. Off. |

OTHER PUBLICATIONS

Search Report issued by Institut National de la Propriete Industrielle, France, dated Sep. 17, 1996, Examiner: J. G. Andersen.

*Primary Examiner*—Ping Lee
*Attorney, Agent, or Firm*—Joseph S. Tripoli; Peter M. Emanuel; Kuniyuki Akiyama

[57] ABSTRACT

The present invention relates to a process and a device for the wireless transmission of a signal $S_1$ between a transmitter and at least one receiver.

According to the invention, at the sending end:
  a first carrier $S_2$, of frequency $F_2$, situated in the VHF (Very High Frequency) range, is frequency-modulated by the signal $S_1$ to be transmitted, and then
  a second carrier $S_3$ of frequency $F_3$, situated in the SHF (Super High Frequency) frequency range, is amplitude-modulated by a modulating signal $S_{2m}$, resulting from the frequency modulation of the carrier $S_2$ so as to transmit an amplitude-modulated signal $S_{3m}$ to the receiver,
and at the receiving end:
  amplitude demodulation of the signal $S_{3m}$ is performed so as to recover the signal $S_{2m}$, and then
  frequency demodulation of the signal $S_{2m}$ is performed so as to recover the signal $S_1$.

4 Claims, 3 Drawing Sheets

PROCESS AND DEVICE FOR WIRELESS TRANSMISSION

The present invention relates to a process and a device for the wireless transmission of a signal $S_1$ between a transmitter and at least one receiver.

The invention refers particularly to a process and a device for the wireless transmission of an audio signal between a television set and at least two loudspeakers situated some distance from the said television set.

The known processes for wireless transmission are based on modulating a carrier whose frequency is situated in the infrared (IR) range. The waves representing the IR signals have mono-directional propagation and therefore experience interruptions due to obstacles which may be located between the transmitter and the receiver. Furthermore, to obtain good transmission in this frequency range, the transmitter and the receiver(s) have to be very well aligned. Consequently, the use of IR frequency carriers is incompatible with environments, such as a television room for example, in which, to obtain good sound distribution, the loudspeakers have to be situated symmetrically on diagonals and some distance from the television set, as shown diagrammatically in FIG. 1.

Another drawback of the processes using an IR carrier stems from the sensitivity of IR signals to ambient light. Moreover, this type of transmission requires the use of light-emitting diodes (LED) of great sensitivity which, in addition to their high cost, are characterized by a considerable power consumption.

The purpose of the invention is to alleviate the drawbacks of the prior art processes by means of a process of wireless transmission. According to the process of the invention, at the sending end:

a first carrier $S_2$ of frequency $F_2$, situated in the VHF (very high frequency) range, is frequency-modulated by the signal $S_1$, to be transmitted, and then a second carrier $S_3$ of frequency $F_3$, situated in the SHF (super high frequency) frequency range, is amplitude-modulated by a modulating signal $S_{2m}$ resulting from the frequency modulation of the carrier $S_2$ so as to transmit an amplitude-modulated signal $S_{3m}$ to the receiver, and at the receiving end:

amplitude demodulation of the signal $S_{3m}$ is performed so as to recover the signal $S_{2m}$, and then frequency demodulation of the signal $S_{2m}$ is performed so as to recover the signal $S_1$.

The use of the carriers $S_2$ and $S_3$ whose frequencies are situated respectively in the VHF and SHF bands makes it possible, on the one hand, to circumvent the disturbances caused by the ambient light affecting the IR signals, and on the other hand, to increase the probability of effecting a link between the transmitter and the receiver insofar as the SHF signals propagate along a plurality of separate paths. The probability of the said paths being obstructed simultaneously being very low and therefore the signal $S_{3m}$ can reach the receiver via one or more unobstructed paths. In addition, the propagation of an SHF signal through walls is very weak as compared with lower frequencies, thus minimizing the risk of interference between users.

Another advantage of the process according to the invention stems from the implementation of dual FM-AM modulation allowing appreciable simplification of the receiver. Thus, recovery of the signal $S_{3m}$ is performed by conventional amplitude demodulation requiring inexpensive components. Furthermore, the sending of an SHF signal, according to the process of the invention, requires a local oscillator having a relatively modest frequency stability and which consequently is inexpensive, by comparison with the stability required, both at the sending and receiving ends, by the oscillators used in a conventional frequency-modulation system.

The process according to the invention is implemented by means of a device for wireless transmission between a transmitter and a receiver. The transmitter includes three stages mounted in cascade, namely a first stage for amplification/filtering of the signal $S_1$, a second stage for frequency modulation of the carrier $S_2$ and a third stage for amplitude modulation of the carrier $S_3$, whilst the receiver includes three stages mounted in cascade, namely a first stage for amplitude demodulation of the signal $S_{3m}$, a second stage for frequency demodulation of the signal $S_{2m}$ and a third stage for amplification/filtering of the signal $S_1$ received.

Other characteristics and advantages of the invention will emerge from the description which follows, given by a way of non-limiting example, with reference to the appended figures in which.

Figure 3A:
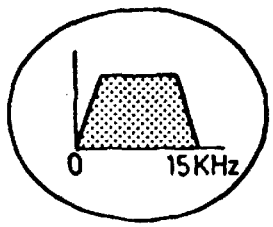
FIG. 3a and FIG. 3b represent a spectrum of a signal $S_1$ transmitted in accordance with the process according to the invention.
Figure 3B:
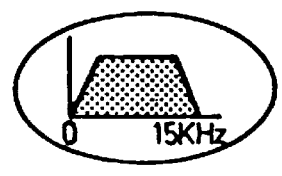

Represented in FIGS. 3a and 3b is a spectrum of a signal $S_1$ intended to be transmitted between a transmitter 10 and a receiver 12 according to the process of the invention in which, at the sending end:

a first carrier $S_2$ of frequency $F_2$, situated in the VHF range, is frequency-modulated by the signal $S_1$ to be transmitted, and then a second carrier $S_3$ of frequency $F_3$, situated in the SHF frequency range, is amplitude-modulated by a modulating signal $S_{2m}$ resulting from the frequency modulation of the carrier $S_2$ so as to transmit an amplitude-modulated signal $S_{3m}$ to the receiver 12, and at the receiving end:

amplitude demodulation of the signal $S_3$m is performed so as to recover the signal $S_{2m}$, and then frequency demodulation of the signal $S_{2m}$ is performed so as to recover the signal $S_1$.

Figure 1:
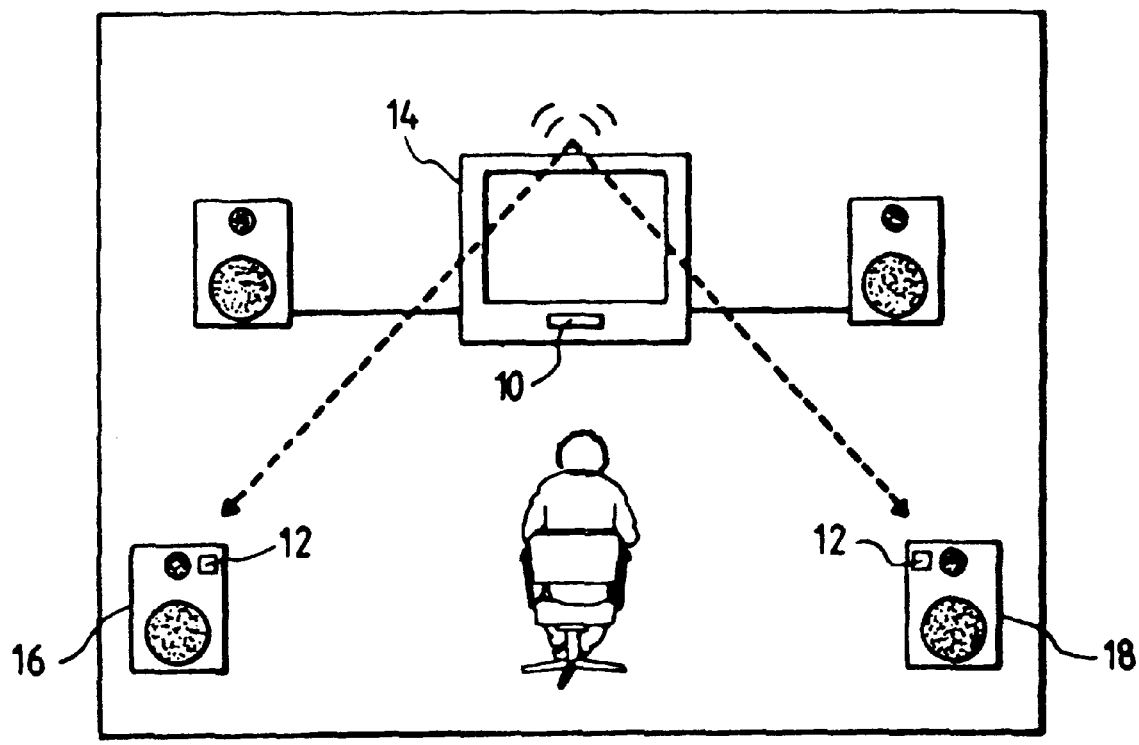
FIG. 1 represents diagrammatically an example of an environment for using the process according to the invention.
Figure 4A:
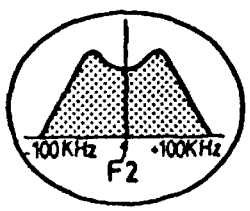
FIG. 4a and FIG. 4b represent a spectrum of a signal $S_{2m}$ resulting from the frequency modulation of a carrier $S_2$ by the signal $S_1$.

In the example of the application of the process according to the invention, illustrated by FIG. 1, a carrier $S_2$ of frequency 1 MHz is modulated by an audio signal $S_1$ dispatched by a television set 14 to two loudspeakers 16 and 18 situated some distance from the said television set 14. As may be seen in FIGS. 4a and 4b, the frequency modulation of the carrier $S_2$ by the signal $S_1$, makes it possible to obtain a maximum frequency excursion $\Delta F$ of $\pm 100$ KHz, about the frequency $F_2$. Since the frequency excursion $\Delta F$ is proportional to the amplitude of the signal $S_1$ it follows that adjustment of the sound level of the loudspeakers 16 and 18 is achieved by adjusting the said frequency excursion ΔF. With such a process, there is no need to use an additional channel to control the sound level of the loudspeakers.

Figure 5A:
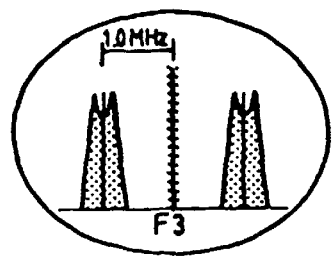
FIG. 5a and FIG. 5b represent a spectrum of a signal $S_{3m}$ resulting from the amplitude modulation of a carrier $S_3$ by the signal $S_2$.
Figure 5B:
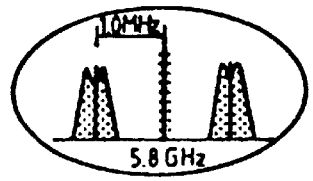

According to a preferred embodiment of the process of the invention, the carrier $S_3$ has a frequency $F_3$ equal to 5.8 GHz. The spectrum of the signal $S_{3m}$, obtained by the amplitude modulation of the carrier $S_3$ and represented by FIGS. 5a and 5b, includes a central line representing the frequency $F_3$, and two sidebands, representing the modulating signal $S_{2m}$, which are centered on the frequency $F_2$.

Figure 2:
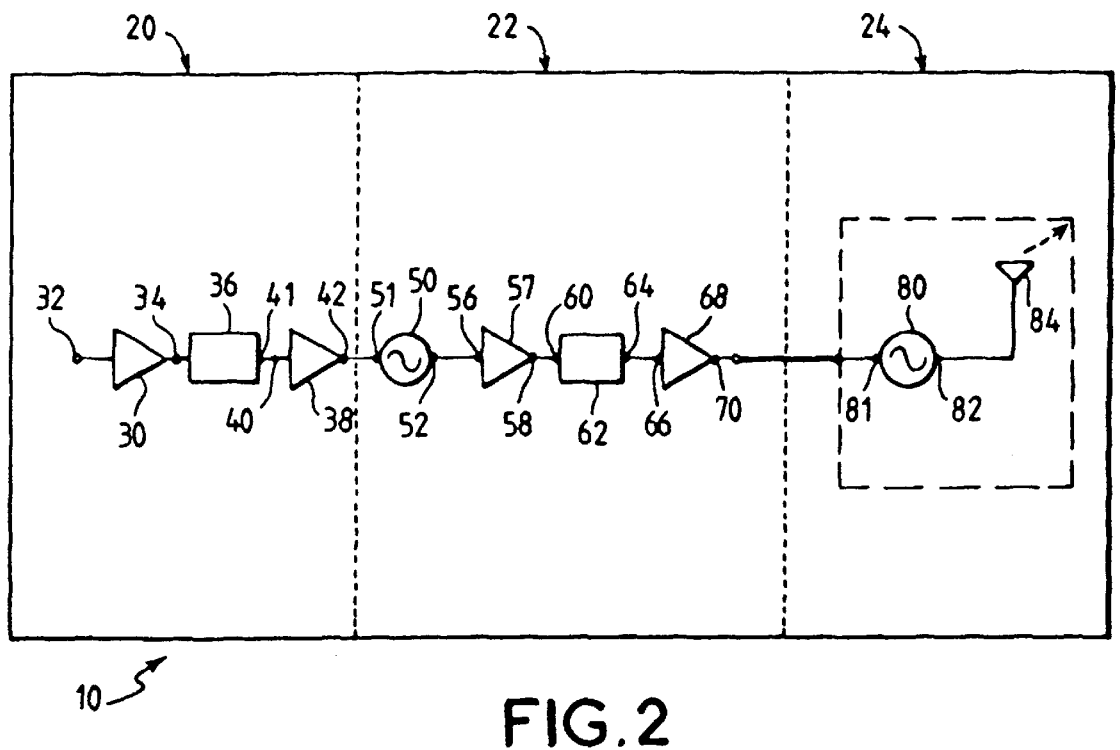
FIG. 2 represents diagrammatically a transmitter making it possible to implement a process according to the invention.
Figure 6:
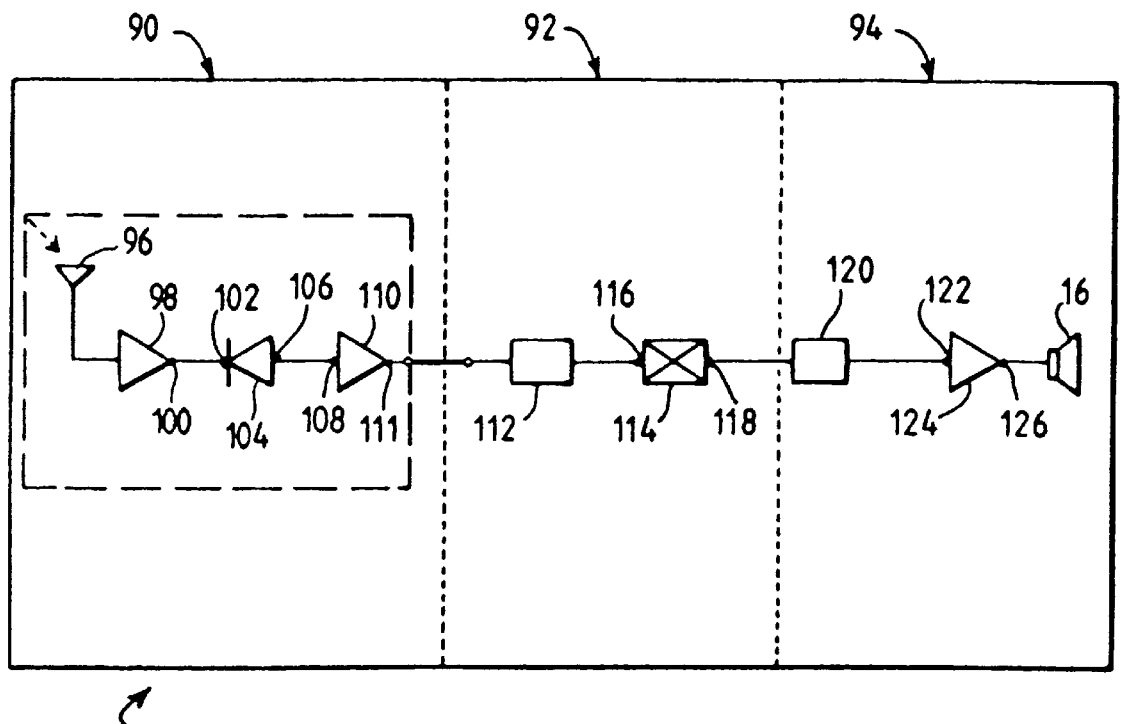
FIG. 6 represents diagrammatically an FM-AM receiver making it possible to implement a process according to the invention.

The process according to the invention is implemented by a device for wireless transmission including the transmitter 10 and the receiver 12 represented diagrammatically by FIGS. 2 and 6 respectively. As may be seen in FIG. 2, the transmitter 10 includes three stages mounted in cascade, namely a first stage 20 for amplification/filtering of the signal $S_1$ to be transmitted, a second stage 22 for frequency modulation of the carrier $S_2$ and a third stage 24 for amplitude modulation of the carrier $S_3$.

In the example of a particular application, illustrated by FIG. 1, the stage 20 includes a first audio amplifier 30, an input 32 of which receives the signal $S_1$ and an output 34 of which is linked to a first filtering means 36, a second audio amplifier 38, an input 40 of which receives, from the filtering means 36, the signal $S_1$ preamplified and filtered, and an output 42 of which is linked to the frequency modulation stage 22. The said frequency modulation stage 22 includes a voltage-controlled RF (radio frequency) oscillator (VCO) 50 intended to generate the signal $S_2$ and an input 51 of which receives the signal $S_1$, whilst an output 52 delivers the signal $S_{2m}$ resulting from the frequency modulation of the said signal $S_2$ by the signal $S_1$, to a first RF amplifier 57, an output 58 of the said first RF amplifier 57 is linked to an input 60 of a second filtering means 62, an output 64 of which is linked to an input 66 of a second RF amplifier 68. An output 70 of the said second RF amplifier 68 is linked to the amplitude modulation stage 24.

The said amplitude modulation stage 24 includes an SHF (super high frequency) oscillator 80 intended to generate the carrier $S_3$ and delivering to an output 82 the signal $S_{3m}$ resulting from the amplitude modulation of the said carrier $S_3$ by the signal $S_{2m}$. The output 82 of the said SHF oscillator 80 is linked to an antenna 84 intended to send the signal $S_{3m}$ to the receiver 12.

According to a preferred embodiment of the invention, the receiver 12, represented in FIG. 6, includes three stages mounted in cascade, namely a first stage 90 for amplitude demodulation of the signal $S_{3m}$, a second stage 92 for frequency demodulation of the signal $S_{2m}$ and a third stage 94 for amplification/filtering of the signal $S_1$ received.

The stage 90 includes an antenna 96 for receiving the signal $S_{2m}$, linked to a preamplification means 98, an output 100 of which is linked to a first terminal 102 of an AM detector 104; a second terminal 106 of the said AM detector 104 is linked to an input 108 of an amplification means 110 with high impedance, an output of which is linked to the stage 92. The said stage 92 includes a third filtering means 112, linked to an input 116 of a frequency demodulator 114, an output 118 of which delivers the signal $S_1$ to the stage 94.

The stage 94 includes a fourth filtering means 120 linked to an input 122 of a third audio amplifier 124, an output 126 of which is linked to a loudspeaker 16.

Figure 4B:
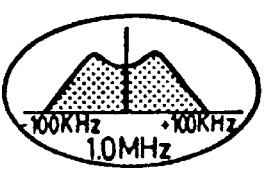

Thus, after filtering and amplification in the stage 20, the signal to be transmitted $S_1$ is applied to the input 51 of the RF oscillator 50 so as to frequency-modulate the carrier $S_2$ generated by the said RF oscillator 50. The signal $S_{2m}$ obtained is next amplified and filtered and then applied to the input of the SHF oscillator 80 so as to amplitude-modulate the carrier $S_3$ generated by the said oscillator 80. The signal $S_{3m}$ obtained is next sent by the antenna 84 to the antenna 96. On reception, the signal $S_{3m}$ is preamplified by the preamplifier 98 and then applied to the AM detector 104 so as to recover the modulating signal $S_{2m}$ whose spectrum is represented in FIG. 4b.

The signal $S_{2m}$ is next applied to a frequency demodulator 144, via the filtering means 112. The said demodulator 114 delivers at its output 118 the signal $S_1$ which is next dispatched to the loudspeaker 16 via the filtering means 120.

By virtue of the process and the device according to the invention, the signal transmitted is rendered immune to disturbances such as ambient light and any obstacles which might cause interruptions of the transmitter-receivers link. Furthermore, owing to the use of amplitude modulation of the SHF carrier, the structure of the receiver used is appreciably simplified.

We claim:

1. A method for wireless transmission of an audio signal from a transmitter to a receiver in a home theater in which both said transmitter and said receiver are located within a room, comprising the steps of:

frequency modulating (FM) a first carrier signal in a VHF band of frequencies with said audio signal for providing a modulation signal;

amplitude modulating (AM) a second carrier signal in an SHF band of frequencies with said modulating signal for providing an AM signal;

transmitting said AM signal to said receiver located in said home theater;

receiving said AM signal from said transmitter located in said home theater;

demodulating said AM signal for recovering said modulating signal; and demodulating said modulating signal for recovering said audio signal.

2. The method according to claim 1, wherein said modulation signal is transmitted from a television apparatus to a plurality of loudspeakers, said plurality of loudspeakers being positioned so as to enjoy the maximum frequency deviation of said first carrier signal.

3. The method according to claim 1, wherein said second carrier frequency is 5.8 GHz.

4. The method according to claim 1, wherein said frequency deviation is adjusted to control the sound level of said plurality of said loudspeakers.

\* \* \* \* \*